US009576434B2

(12) United States Patent
Parks et al.

(10) Patent No.: US 9,576,434 B2
(45) Date of Patent: Feb. 21, 2017

(54) IMPLEMENTING COMPUTER ACTIVITY-BASED CHALLENGES

(75) Inventors: William T. Parks, San Francisco, CA (US); Jonathan Warren Webb, Sausalito, CA (US); James Wang, Belmont, CA (US)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 13/190,411

(22) Filed: Jul. 25, 2011

(65) Prior Publication Data
US 2013/0029765 A1    Jan. 31, 2013

(51) Int. Cl.
A63F 13/06        (2006.01)
G07F 17/32        (2006.01)
A63F 13/798       (2014.01)
A63F 13/46        (2014.01)
G06Q 50/00        (2012.01)

(52) U.S. Cl.
CPC ......... G07F 17/3276 (2013.01); A63F 13/46 (2014.09); A63F 13/798 (2014.09); G06Q 50/01 (2013.01); G07F 17/32 (2013.01); G07F 17/323 (2013.01); G07F 17/3225 (2013.01); G07F 17/3279 (2013.01)

(58) Field of Classification Search
CPC .............................. A63F 13/798; A63F 13/85
USPC .......................................................... 463/42
See application file for complete search history.

(56) References Cited

U.S. PATENT DOCUMENTS

| 6,722,888 | B1  |   | 4/2004  | Macri et al. |
| 6,840,861 | B2  |   | 1/2005  | Jordan et al. |
| 6,985,747 | B2  |   | 1/2006  | Chithambaram |
| 7,614,958 | B2  |   | 11/2009 | Weston et al. |
| 2004/0002369 | A1 | * | 1/2004  | Walker et al. ................. 463/1 |
| 2004/0224741 | A1 | * | 11/2004 | Jen et al. ....................... 463/6 |
| 2006/0042483 | A1 |   | 3/2006  | Work et al. |
| 2006/0178765 | A1 | * | 8/2006  | Graepel et al. ............... 700/91 |
| 2007/0066403 | A1 | * | 3/2007  | Conkwright ................. 463/43 |
| 2007/0173324 | A1 |   | 7/2007  | Multerer et al. |
| 2007/0238507 | A1 |   | 10/2007 | Sobel et al. |
| 2008/0086534 | A1 | * | 4/2008  | Bardak et al. ............. 709/206 |
| 2009/0197681 | A1 |   | 8/2009  | Krishnamoorthy et al. |
| 2009/0221365 | A1 | * | 9/2009  | Levy ........................... 463/29 |

(Continued)

FOREIGN PATENT DOCUMENTS

CN         101933038 A        12/2010

OTHER PUBLICATIONS

U.S. Appl. No. 13/176,640, filed Jul. 5, 2011.

(Continued)

Primary Examiner — Lawrence Galka
(74) Attorney, Agent, or Firm — Joshua D. Isenberg; JDI Patent

(57) ABSTRACT

A computer activity-based challenge may be posted by a computer system to a social network associated with a user of the computer system. A notification may be received from the social network by the computer system indicating acceptance of the challenge for each subscriber of the social network who accepts the challenge. A result obtained by each subscriber who accepted the challenge may be recorded by the computer system after receiving the result from the social network. In some implementations a value associated with the challenge may be updated using dynamic scoring.

20 Claims, 8 Drawing Sheets

(56) References Cited

U.S. PATENT DOCUMENTS

2010/0216553 A1* 8/2010 Chudley et al. .............. 463/42
2010/0306672 A1 12/2010 Mceniry
2011/0010464 A1 1/2011 Morrison et al.
2011/0223996 A1* 9/2011 Yerli et al. .................. 463/36
2011/0252079 A1 10/2011 Werner et al.
2013/0084969 A1 4/2013 Knoles et al.

OTHER PUBLICATIONS

U.S. Appl. No. 13/181,464, filed Jul. 12, 2011.
Final Office Action for U.S. Appl. No. 13/176,640, dated Oct. 12, 2012.
Final Office Action for U.S. Appl. No. 13/176,640, dated Oct. 24, 2013.
International Search Report and Written Opinion for International Application No. PCT/US2012/045454, dated Jul. 27, 2012.
Non-Final Office Action for U.S. Appl. No. 13/176,640, dated Jun. 7, 2012.
Non-Final Office Action for U.S. Appl. No. 13/176,640, dated Mar. 27, 2013.
Non-Final Office Action for U.S. Appl. No. 13/181,464, dated Jan. 6, 2014.
Notice of Allowance for U.S. Appl. No. 13/176,640, dated Mar. 11, 2014.
U.S. Appl. No. 14/337,076, to William T. Parks, filed Jul. 21, 2014.
Non-Final Office Action for U.S. Appl. No. 13/181,464 dated, Nov. 26, 2014.
Non-Final Office Action for U.S. Appl. No. 14/337,076, dated Apr. 10, 2015.
Chinese Office Action for CN Application No. 201210347553.5, dated May 6, 2015.
Final Office Action for U.S. Appl. No. 14/337,076, dated Oct. 23, 2015.
Non-Final Office Action for U.S. Appl. No. 13/181,464, dated Jan. 14, 2016.
Final Office Action for U.S. Appl. No. 13/181,464, dated Jul. 1, 2015.
Non-Final Office Action for CN Application No. 201210347553.5, dated May 6, 2016.
Chinese Office Action for CN Application No. 201210347553.5, dated Nov. 30, 2016.
Non-Final Office Action for U.S. Appl. No. 13/181,464, dated Dec. 29, 2016.

* cited by examiner

IMPLEMENTING COMPUTER ACTIVITY-BASED CHALLENGES

FIELD OF THE INVENTION

Embodiments of the present invention are related to a method and system for employing computer game activity-based challenges

BACKGROUND OF THE INVENTION

Currently, many computer game platforms allow users to communicate with each other over a network. Several users may compete against each other in an online multiplayer setting. Users may also send messages to each other on a one-to-one basis (i.e., can only send one message to one user at a time; no mass messaging). These messages may involve challenges, wherein a user challenges another user to achieve a particular status in a game. These challenges may involve beating high scores, beating best times, or attaining other achievements. However, these challenges are limited in their reach. A challenge may be issued to only a single challenger at a time. A user who wishes to challenge multiple users may only do so by sending each potential challenger a separate message. An additional challenge faced by a user may be a limited reach within the gaming network. The user may only be aware of a few friends who are active on his gaming platform's network, and as such may be limited to issuing challenges to those friends or other random users connected to the network.

Another limitation faced by current computer game activity-based challenges, is a lack of a universal and accurate scoring system. Currently, computer game activity-based challenges are not associated with a value, or are associated with arbitrary values that fail to reflect the difficulty of the challenge. Thus, the desire for a challenger to engage in a particular computer game activity-based challenge stems from his relationship with the issuer of the challenge. The desire for a challenger to accept a challenge issued by a random user is diminished, because the challenger receives no added benefit (e.g., higher ranking, points to be used within a gaming platform, etc.) from winning the challenge.

It is within this context that embodiments of the present invention arise.

DESCRIPTION OF THE SPECIFIC EMBODIMENTS

Figure 1:
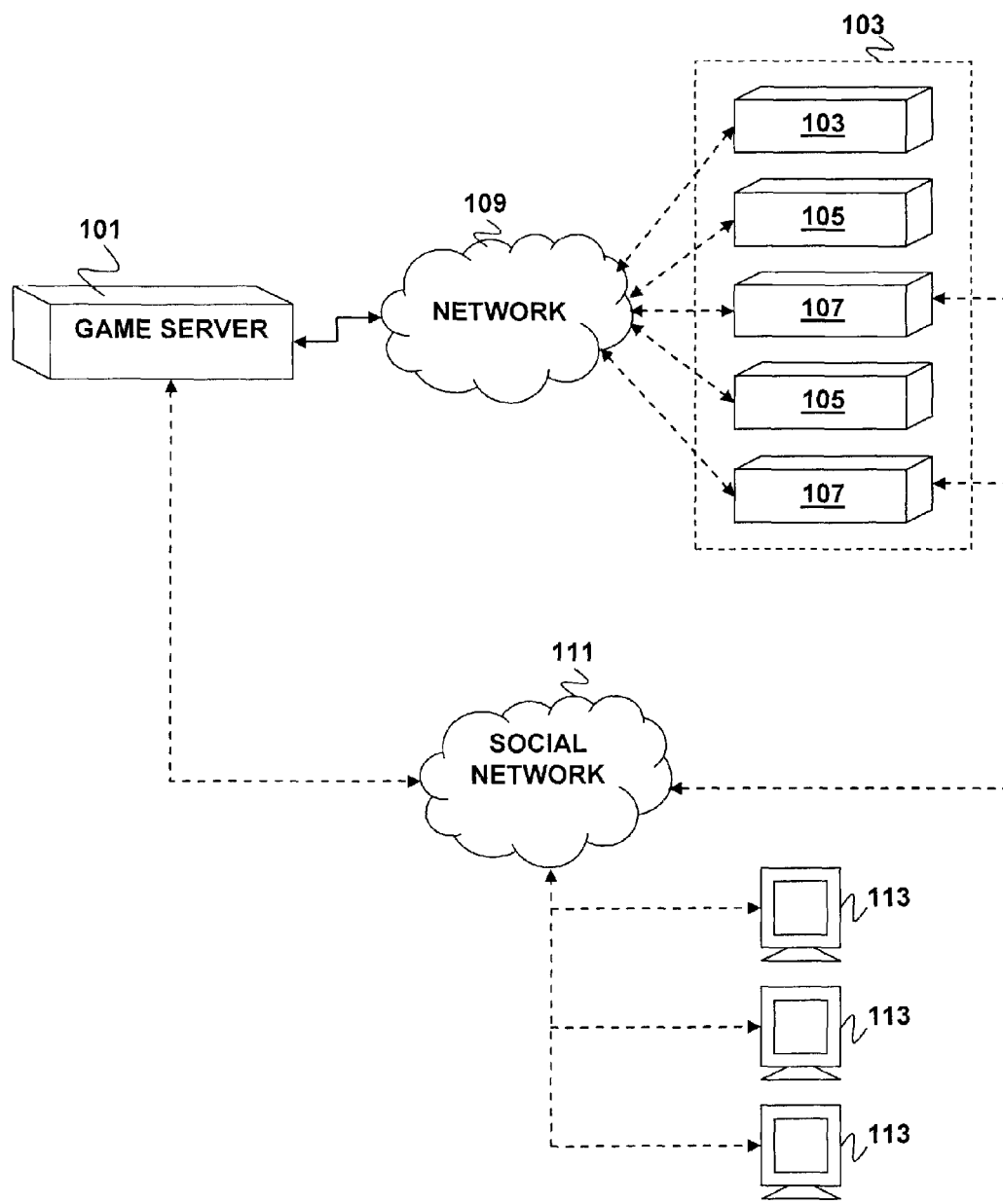
FIG. 1 is a schematic diagram illustrating a network environment implementing a method for employing computer game activity-based challenges in accordance with an embodiment of the present invention.

FIG. 1 is a schematic diagram illustrating a network environment implementing a method for employing computer game activity-based challenges in accordance with an embodiment of the present invention. By way of example, and not by way of limitation, in a computer system 100, a plurality of client devices 103, 105, 107 may be connected to a server 101 via a network 109. The server 101 facilitates interaction between the client devices 103, 105, 107 connected to it. By way of example, and not by way of limitation, this interaction may involve sending messages, talking, and playing games together in multi-player mode. In some implementations, the server 101 may be a game server. It is noted that in some implementations, the system 100 may omit the server and its functions may be distributed amongst the client devices 103, 105, 107. Examples of such implementations include peer-to-peer network configurations.

The network 109 is representative of many different network types, including public networks (e.g., the Internet) and proprietary networks. The network 109 may be implemented using wireless technologies (e.g., radiofrequency, microwave, cellular, and the like), wire-based technologies (e.g., cable, fiber optic, twisted pair wire, co-axial cable, and the like), or any combination of wired and/or wireless technologies. Any one of many diverse protocols and formats may be used to package data and transmit it among the client devices 103, 105, 107 and server 101.

Several of the client devices 103, 107 may be additionally connected to a common computer-implemented social network 111. As used herein term "social network" generally refers a social structure made up of individuals, who are linked by one or more interdependencies (e.g., friendship, common interests, etc). By way of example, and not by way of limitation, a social network may be implemented in a client-server configuration, wherein the server facilitates communication between clients. In particular some or all of the client devices 103, 105, 107 may be connected to a social network server 112. Alternatively, by way of example, and not by way of limitation, the social network 111 may be implemented in a peer-to-peer configuration, wherein client devices may communicate directly with each other. A social network may be public, such that each client connected to the network may be allowed to communicate with every other client connected to the network. A social network may also be private, such that a particular client may determine which other clients on the network have access to communicate with the client. Those other clients who have access to communicate with the particular client via the social network will be referred to hereinafter as "subscribers".

In addition to having computer game systems 101, 107 linked to the social network 111, the social network 111 may also be configured to connect other client devices 113. By way of example, and not by way of limitation, these client devices 113 may take the form of laptop computers, tablet PCs, or smartphones. It is important to note that the social network 111 and game server 113 may be regarded as different entities, but may have overlapping components (e.g., client devices). Furthermore, embodiments of the present invention include implementations in which the computer system 101 and the social network overlap entirely or almost entirely. Examples of such implementations include configurations in which the social network server and the computer system server 109 are implemented in different portions of software running on a common hardware platform or different platforms located at a common facility.

Figure 2:
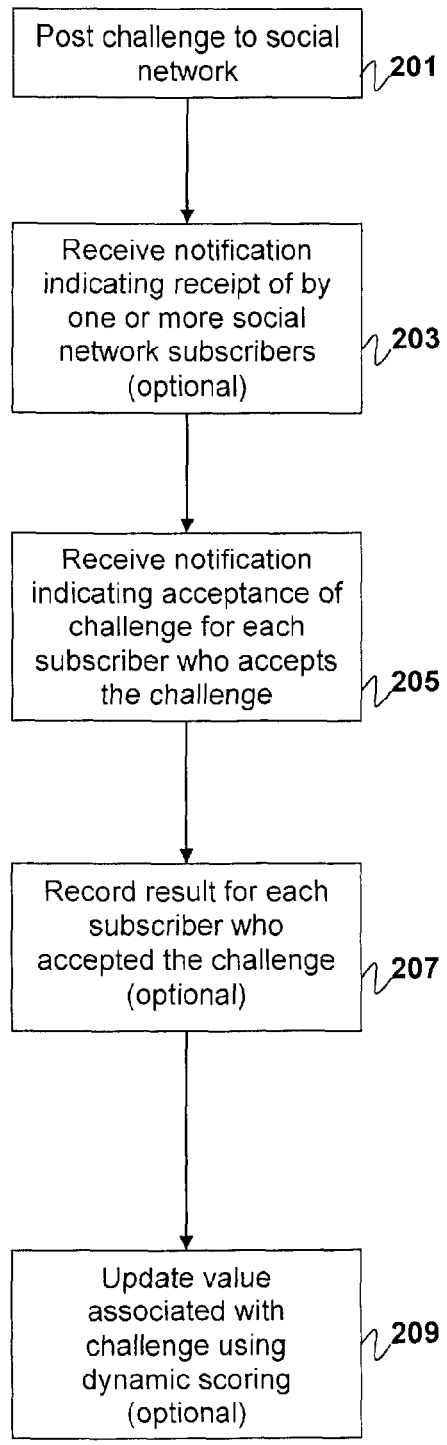
FIG. 2 is a flow diagram illustrating a method for employing a computer game activity-based challenge in accordance with an embodiment of the present invention.

The computer system 103 may implement a method for employing computer game activity-based challenges in accordance with the steps illustrated in FIG. 2. FIG. 2 is a flow diagram illustrating a method for employing a computer game activity-based challenge in accordance with an embodiment of the present invention.

The computer game system may initially post a computer game activity-based challenge to a social network associated with a user of the computer game system as indicated at 201. By way of example, and not by way of limitation, the computer game activity-based challenge may involve beating the user's high score in a particular game setting, beating the user's best time in a particular game setting, or beating the user in a head-to-head game setting. The computer game system may filter which subscribers of the social network have access to the computer-game activity based challenge, which will be described in greater detail below. The ability to post a challenge to a social network allows a user of the computer game system to exchange challenges on a one-to-many basis as opposed to the one-to-one challenge exchange system currently employed by gaming platforms. Moreover, posting challenges to a social network allows a user of the computer game system to extend the reach of his challenge by inviting subscribers on his social network who are also connected to his gaming network of which he was previously unaware.

It is noted that, within the context of embodiments of the present invention, a challenge need not necessarily need to be initiated by a specific user. Alternatively, a challenge could be automatically initiated based on pre-set or dynamic criteria and distributed (e.g. from the game server) 113 via the social network 111 to the users who meet the criteria of the challenge. Furthermore, in addition to the examples listed herein, it may be worth noting that the criteria for a challenge may be the user's physical location, purchase history, gameplay history, etc. In other words, challenge criteria may include things not directly related to the gameplay activity of a single game. It is further noted "challenges" do not necessarily need to be "competitive" in nature. A large group can collaborate towards some goal, where users within the group issue challenges to each other to reach the shared goal.

The computer game system may then optionally receive a notification from the social network indicating receipt of the computer game activity-based challenge by one or more subscribers of the social network as described at 203. The notification may indicate which subscribers of the social network received the computer game activity-based challenge. By way of example, and not by way of limitation, the social network may filter which types of computer-game activity based challenges are received by the subscribers, which will be described in greater detail below.

It is sometimes described that the "game" or "game system" or "computer system" receives the challenge notification from the social network 111. Embodiments of the present invention, include implementations in which a game platform or computer platform or some other agent of the game system (or computer system) could receive the challenge from a service or server (such as the game server 113) service via the social network 111. Furthermore, the challenge "notification" may optionally be retrieved from the network or directly notified to the game/computer system platform (e.g., a game console device, personal computer, smart phone, tablet computer, hand-held game device or other agent).

The computer game system may then receives a notification indicating acceptance of the computer game activity-based challenge for each subscriber of the social network who accepts the activity-based challenge as indicated at 205. By way of example, and not by way of limitation, this notification may indicate the name of the subscriber and the time of acceptance.

The computer game system may then optionally record a result obtained by each subscriber who accepted the computer game activity-based challenge after receiving the result from the social network as indicated at 207. By way of example, and not by way of limitation, this result may indicate whether the subscriber won the challenge, whether the subscriber lost the challenge, and also how many times the subscriber attempted the challenge.

Once the computer game system has recorded a result obtained by a subscriber who accepted the computer game activity-based challenge, the computer game system may optionally update a value associated with the computer game activity-based challenges using dynamic scoring as indicated at 209. By updating the value associated with the computer game activity-based challenge after each subscriber result, the computer game activity-based challenge is able to dynamically reflect the difficulty of the challenge. The process of updating the value associated with the computer game activity-based challenge will be discussed in further detail below.

Figure 3:
FIG. 3 is a schematic diagram depicting filtering of subscribers of the social network who receive the computer game activity-based challenge by a computer game system according to an embodiment of the present invention.
Figure 4:
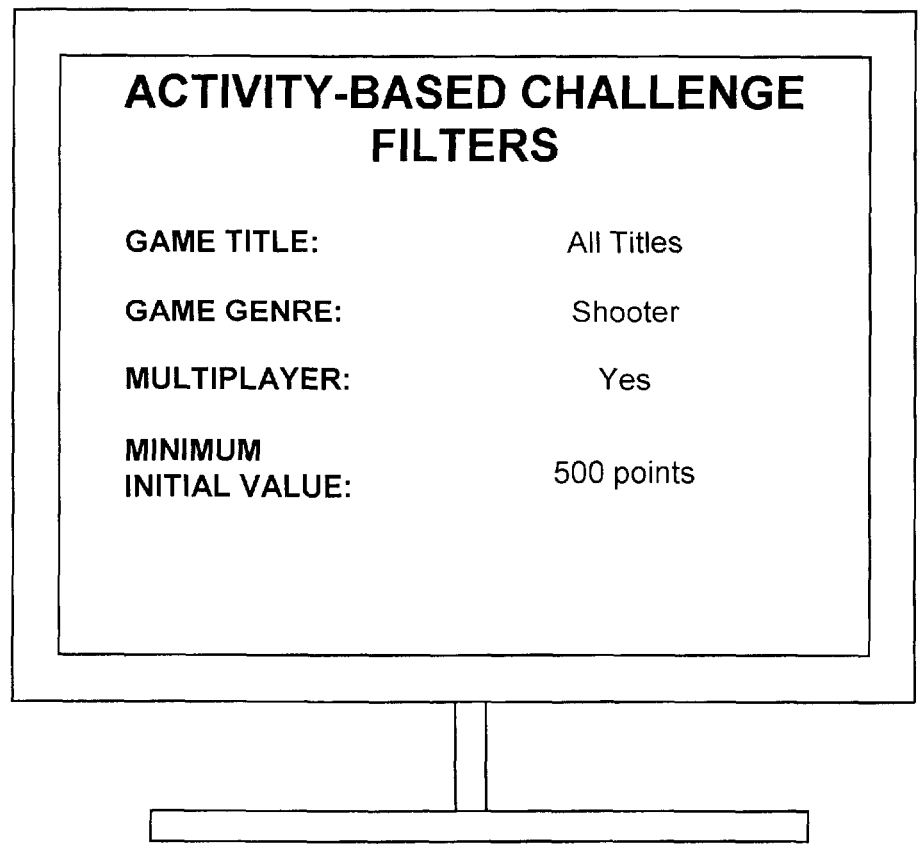
FIG. 4 is a schematic diagram depicting filtering of computer game activity-based challenges by a social network according to an embodiment of the present invention.

The process of filtering either the subscribers to the social network who receive computer game activity-based challenges or the computer game activity-based challenges themselves will be described in more detail with respect to FIG. 3 and FIG. 4. FIG. 3 is a schematic diagram depicting filtering of subscribers of the social network who receive the computer game activity-based challenge by a computer game system. A user of a computer game system may establish a set of parameters by which subscribers of the user's social network are filtered from receiving computer game activity-based challenges. This set of parameters may govern all challenges issued by the computer game system, or these parameters may be adjusted on a challenge-by-challenge basis.

By way of example, and not by way of limitation, these parameters may include the physical location of the subscribers, the age of the subscribers, the school attended by the subscriber, the favorite sports team of the subscriber, and any other parameter by which subscribers of a social network may be filtered, e.g., by the server 101 or by the client devices 103, 105, 107, 113 belonging to the subscribers. In a prophetic example, a user of the computer game system limits the subscribers who receive his computer game activity-based challenge to all users within his social network in the United States who are fans of the San Francisco Giants and over the age of 18. One can imagine limitless combinations of parameters being used to filter subscribers who receive a computer game activity-based challenge. By way of example, and not by way of limitation, these parameters may be coupled with subscriber profiles within a social network that identify subscriber preferences and other relevant subscriber information.

The computer game system may control the social network subscribers who receive computer game activity-based challenges, but the social network can control the types of computer game activity-based challenges received. FIG. 4 is a schematic diagram depicting filtering of computer game activity-based challenges by a social network. A subscriber to a social network may establish a set of parameters by which types of computer game activity-based challenges are filtered. This set of parameters may govern all computer game activity-based challenges issued by a computer game system and may be modified by the subscriber at any time.

By way of example, and not by way of limitation, these parameters may include the title of the game to which the computer game activity-based challenge belongs, the genre to which the computer game activity-based challenge belongs, whether the computer game activity-based challenge involves a single player or multiple players, a threshold value associated with the computer game activity-based challenge, and any other parameter by which computer game activity-based challenges may be filtered. In our example, a subscriber to a social network limits the computer game activity-based challenges received to shooting games that involve multiple players with an associated minimum initial value of at least 500 points. One can imagine limitless combinations of parameters being used to filter computer game activity-based challenges.

Figure 5:
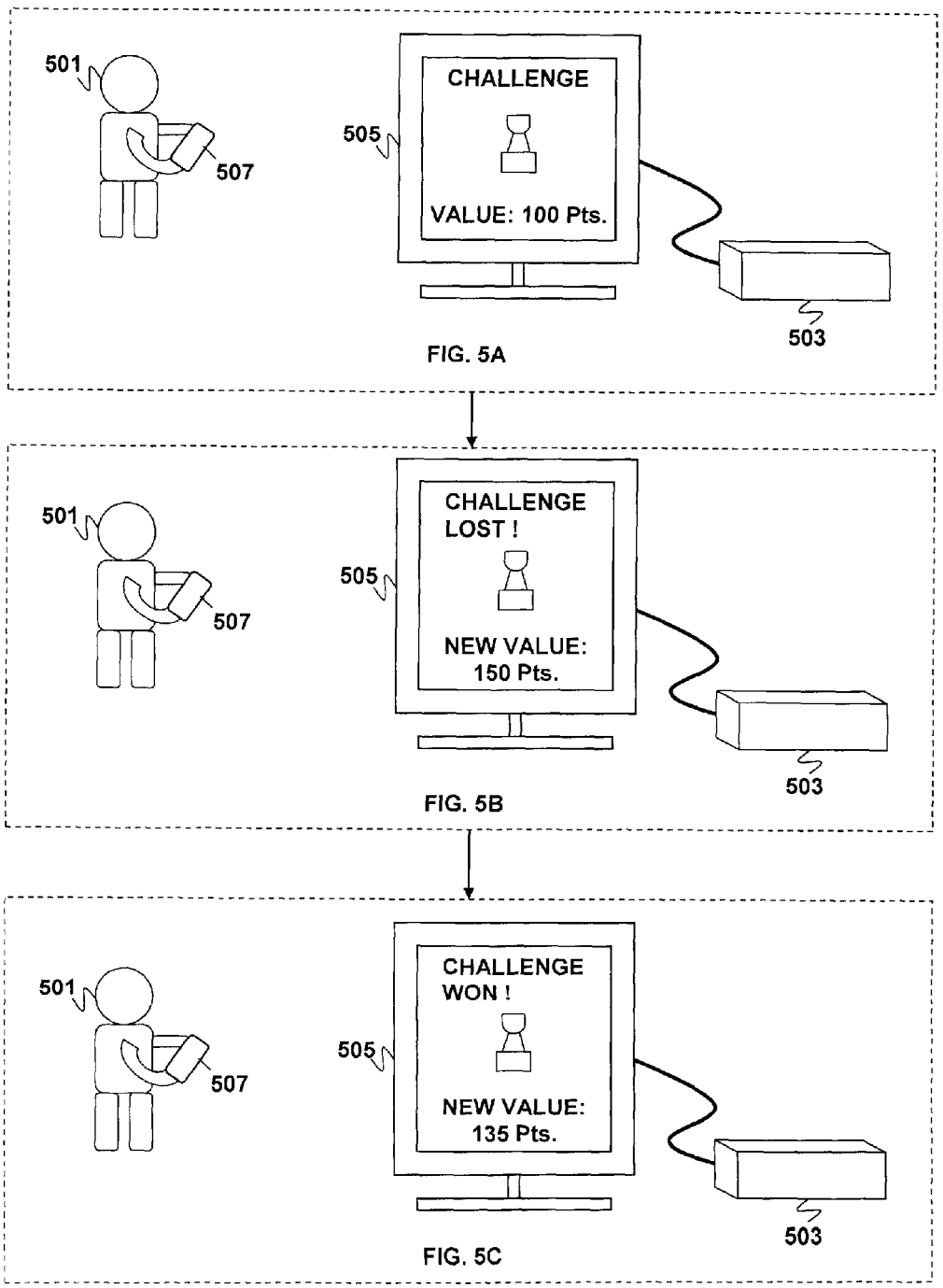
FIGS. 5A-C are schematic diagrams illustrating a system for dynamic scoring of computer game activity-based challenges in accordance with an embodiment of the present invention.

In order to assess the worth of these computer game activity-based challenges, a value system must be created. A user issuing a challenge may set an arbitrary value for each computer game activity-based challenge, but that would make comparison across challenges difficult, and would make it quite impractical to determine a challenge's relative worth. FIGS. 5A-C are schematic diagrams illustrating a system for dynamic scoring of computer game activity-based challenges in accordance with an embodiment of the present invention.

FIG. 5A depicts an initial state of the computer game activity-based challenge prior to receipt by subscribers of the social network. A user 501 creates a challenge which is posted to the social network through a computer game system 503. The user may interact with the computer game system 503 through a visual display 505 and user interface 507 (e.g., wireless controller). The computer game activity-based challenge is assigned an initial value. By way of example, and not by way of limitation, this initial value may be based on a set of criteria determined by the computer game system. For example, a challenge to race a car around a lap in under 2 minutes in beginner mode will be given a significantly lower initial value than a challenge to race a car around a lap in under 1 minute in advanced mode. The activity based challenge in the depicted example, is assigned an initial value of 100 points.

By way of example, and not by way of limitation, a way to dynamically score a computer game activity-based challenge may involve determining the ratio of the number of subscribers who win a challenge to the number of subscribers who accept/attempt a challenge. This method of dynamic scoring may also take into account each competing subscriber's skill level, such that challenge wins and losses are weighted according to a subscriber's skill level. By keeping track of the number of successful challenge attempts relative to the total number of challenge attempts, the computer game system is able to dynamically allocate a worth to a particular computer game activity-based challenge. This worth is tied to the difficulty of the challenge (i.e., a challenge that results in a smaller percentage of wins is given a higher value and a challenge that results in a higher percentage of wins is given a lower value) and reflects the most current attempt at winning the challenge.

FIG. 5B illustrates the computer game activity-based challenge in FIG. 5A after a subscriber to the social network attempts and loses the challenge. After recording a result obtained by the subscriber who accepted the computer game activity-based challenge, the computer game system may then update the value associated with the computer game challenge using the method of dynamic scoring discussed above. The subscriber's loss reflects the difficulty of the challenge, and the value of the challenge is adjusted upward accordingly.

FIG. 5C illustrates the computer game activity-based challenge in FIGS. 5A and 5B after a second subscriber to the social network attempts and wins the challenge. Again, after recording a result obtained by the second subscriber who accepted the computer game activity-based challenge, the computer game system may update the value associated with the computer game challenge using dynamic scoring. The second subscriber's win reflects the simplicity of the challenge, and the value of the challenge is adjusted downward accordingly.

Being able to dynamically value a computer game activity-based challenge, allows a computer game system to accurately reflect the challenge's difficulty and worth. Moreover, challenges may be compared across titles when the same dynamic scoring formula is applied to all challenges.

It is noted that system of dynamic scoring as described herein may be generally applied to establishing a value for other types of computer-based awards, including, but not limited to prizes and trophies. For example, in the case of a prize, the value of the prize may be calculated or updated by determining a ratio between a current number of subscribers who have received the prize and a current number of subscribers who are eligible for the prize. In the case of a trophy, the value of the trophy may be calculated or updated by determining a ratio between a current number of subscribers who have won the trophy and a current number of subscribers who have competed for the trophy.

Figure 6:
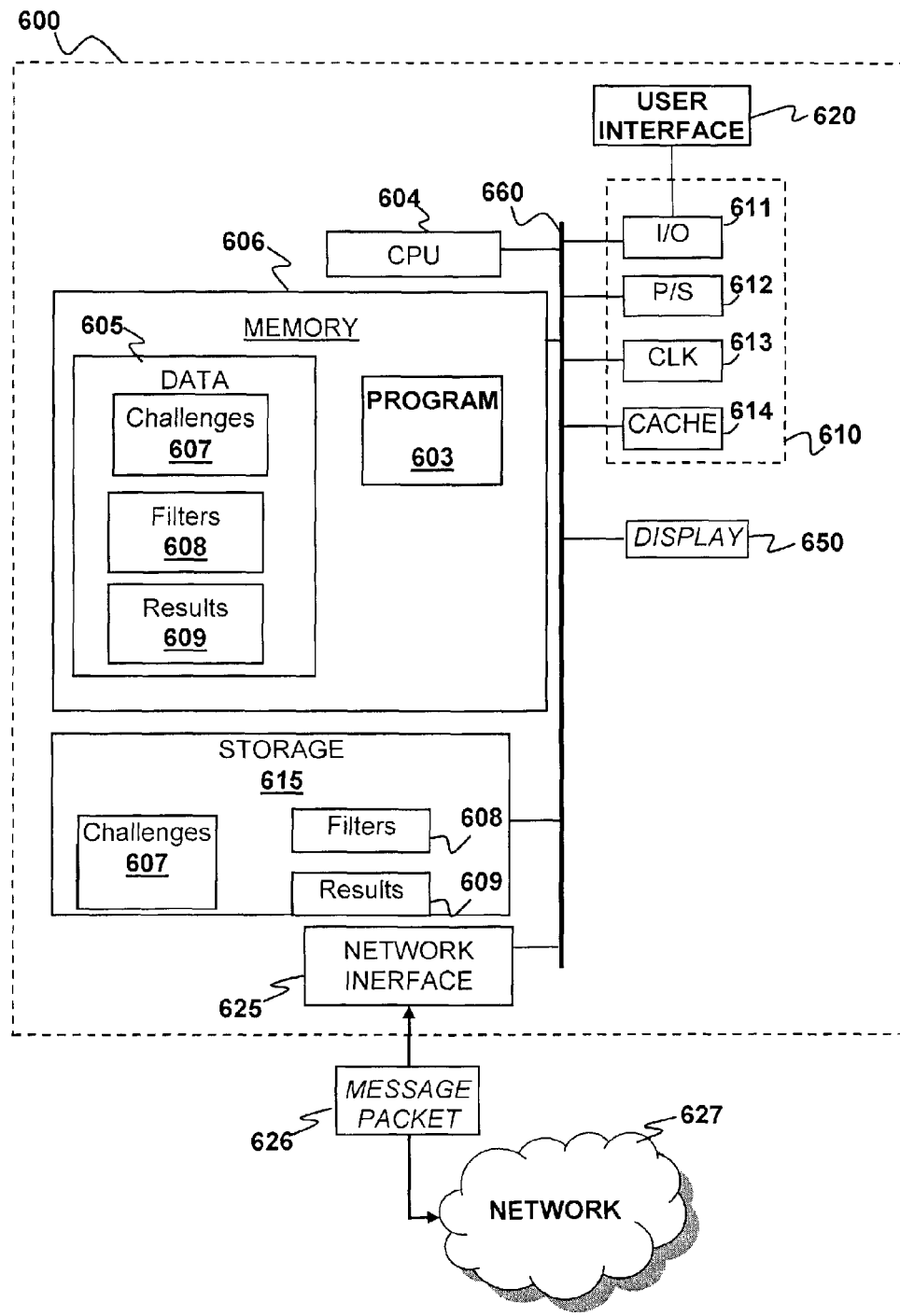
FIG. 6 illustrates a block diagram of a computer server apparatus that may be used to implement a method for implementing computer activity-based challenges according to an embodiment of the present invention.

There are a number of different implementations in which the computer system 103 depicted in FIG. 1A may implement tag-based grouping of online communities, e.g., as described above. In some, but not all, of these embodiments, the method 112 may be implemented primarily through the server 106. By way of example, and without loss of generality, the server 106 in the system 103 may be configured as shown in FIG. 6. As illustrated in FIG. 6, a server 600 may include a central processing unit (CPU) 604 configured to run software applications and optionally an operating system. The CPU 604 may include one or more processing cores. By way of example and without limitation, the CPU 604 may be a parallel processor module, such as a Cell Processor or other multi-core processor module.

A memory 606 is coupled to the CPU 604. The memory 606 may store applications and data for use by the CPU 604. The memory 606 may be in the form of an integrated circuit, e.g., RAM, DRAM, ROM, and the like). A computer program 603 may be stored in the memory 606 in the form of instructions that can be executed on the processor 604. The instructions of the program 603 may be configured to implement, amongst other things, a method for activity-based challenges, e.g., as described above with respect to FIG. 2. Specifically, the program may post a computer activity-based to a computer-implemented social network associated with one or more users of a computer system; and receive a notification from the social network by the computer system indicating acceptance of the challenge for each subscriber of the social network who accepts the challenge. Data 605 including challenges 607, filters 608, and results 609 of challenges may be stored in the memory 606. The challenges 607 may identify the source of the challenge (e.g., the subscriber or pseudonym of the subscriber issuing the challenge), the activity (e.g., game title) associated with the challenge, or the nature of the challenge, e.g., whether to beat a certain score or accomplish a certain task by a certain time. In some cases the program 603 may post a challenge 607 received from a client device. In some cases, the program 603 may transmit acceptances and results 609 received from one or more devices to one or more other client devices. The program 603 may apply the filters 608 to challenges to select challenges to present to particular subscribers.

The server 600 may also include well-known support functions 610, such as input/output (I/O) elements 611, power supplies (P/S) 612, a clock (CLK) 613 and cache 614. The server 600 may further include a storage device 615 that provides non-volatile storage for applications and data. The storage device 615 may be used for temporary or long-term storage of information 616. By way of example, the information 616 may include the challenges 607, filters 608, and/or results 609 or acceptances of challenges. By way of example, the storage device 615 may be a fixed disk drive, removable disk drive, flash memory device, tape drive, CD-ROM, DVD-ROM, Blu-ray, HD-DVD, UMD, or other optical storage devices.

One or more user input devices 620 may be used to communicate user inputs from one or more users to the server 600. By way of example, one or more of the user input devices 620 may be coupled to the server 600 via the I/O elements 611. Examples of suitable input device 620 include keyboards, mice, joysticks, game controllers, touch pads, touch screens, light pens, still or video cameras, and/or microphones. The server 600 may include a network interface 625 to facilitate communication via an electronic communications network 627. The network interface 625 may be configured to implement wired or wireless communication over local area networks and wide area networks such as the Internet. The server 600 may send and receive data and/or requests for files via one or more message packets 626 over the network 627.

The components of the server 600, including the CPU 604, memory 606, support functions 610, data storage 615, user input devices 620, and network interface 625, may be operably connected to each other via one or more data buses 660. These components may be implemented in hardware, software or firmware or some combination of two or more of these.

Figure 7:
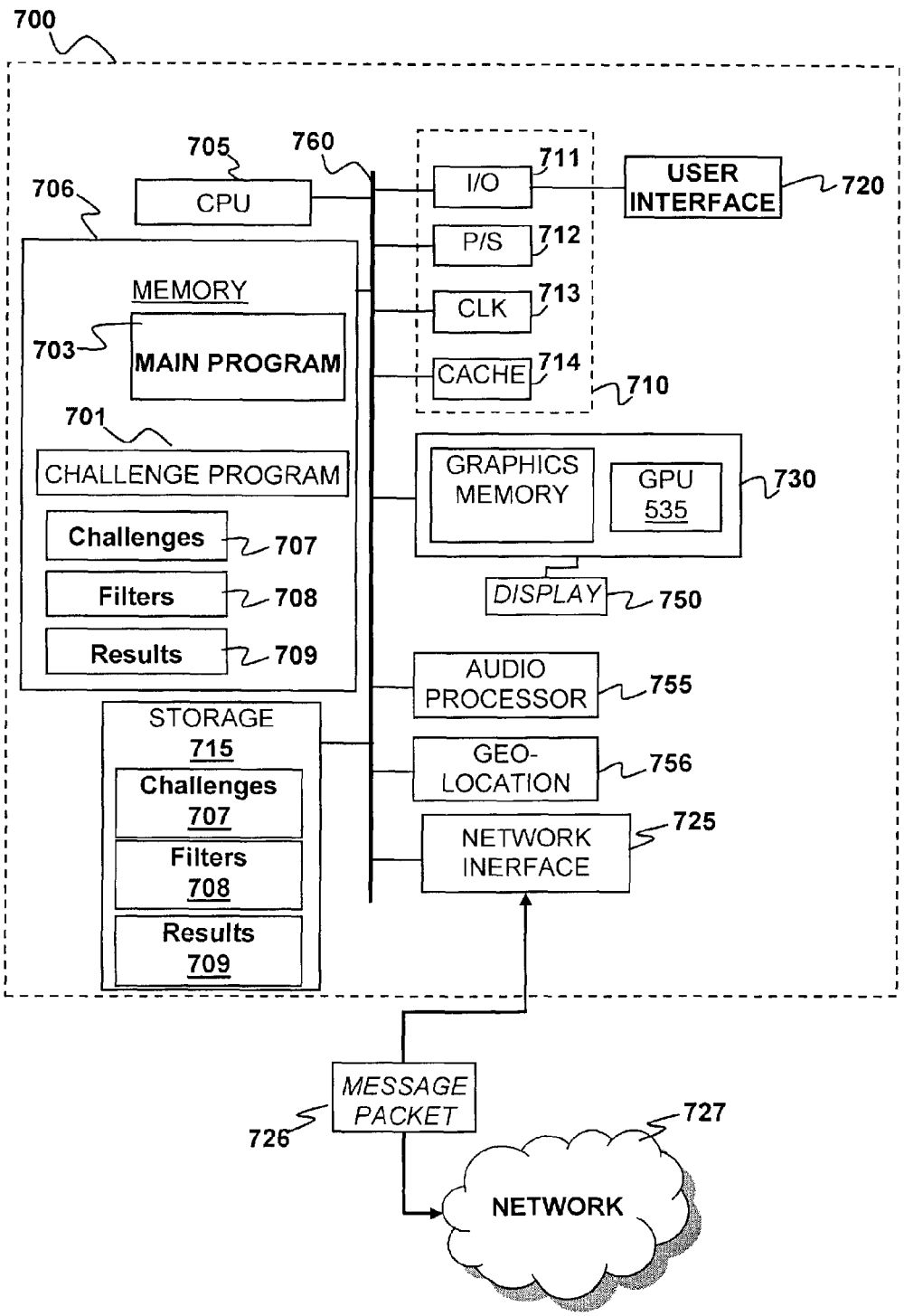
FIG. 7 illustrates a block diagram of a computer client device that may be used to implement a method for implementing computer activity-based challenges according to an embodiment of the present invention.

Embodiments of the present invention may be implemented wholly or partly on a client device. By way of example, such a client device may be configured as shown in FIG. 7, which depicts a block diagram illustrating the components of a client device 700 according to an embodiment of the present invention. By way of example, and without loss of generality, the client device 700 may be implemented as a computer system, such as a personal computer, video game console, personal digital assistant, or other digital device, suitable for practicing an embodiment of the invention. The client device 700 may include a central processing unit (CPU) 705 configured to run software applications and optionally an operating system. The CPU 705 may include one or more processing cores. By way of example and without limitation, the CPU 705 may be a parallel processor module, such as a Cell Processor that uses one or more main processors, sometimes called power processor units (PPU) and one or more co-processor elements sometimes called synergistic processor elements (SPE) having dedicated local storage units. Alternatively, the CPU may be any single-core or multi-core processor.

A memory 706 is coupled to the CPU 705. The memory 706 may store applications and data for use by the CPU 705. The memory 706 may be in the form of an integrated circuit, e.g., RAM, DRAM, ROM, and the like). A computer program 701 may be stored in the memory 706 in the form of instructions that can be executed on the processor 705. The instructions of the program 701 may be configured to implement, amongst other things, a method for activity based challenges, e.g., as described above with respect to FIG. 2. Specifically, the program 701 may post a computer activity-based to a computer-implemented social network associated with one or more users of a computer system; and receive a notification from the social network by the computer system indicating acceptance of the challenge for each subscriber of the social network who accepts the challenge. Challenges 707, challenge filters 708, and results 709 of challenges may be stored in the memory 706. In some cases the challenge program 703 may post a challenge 707 by submitting it to a server or directly to one or more other client devices via a peer-to-peer network. In some cases, the program 703 may receive acceptance notifications and results 709 directly from one or more client devices or via a server. The program 701 may operate in concert with a main program 703, which may be a game program in some embodiments. The challenge program 701 may apply the filters 708 to challenges to select challenges to present to a particular user of the client device.

The client device 700 may also include well-known support functions 710, such as input/output (I/O) elements 711, power supplies (P/S) 712, a clock (CLK) 713 and cache 714. The client device 700 may further include a storage device 715 that provides non-volatile storage for applications and data. The storage device 715 may be used for temporary or long-term storage of information, such as the challenges 707 and/or results 709 and acceptance notifications can be generated by the challenge program 701 or downloaded from a remote server. By way of example, the storage device 715 may be a fixed disk drive, removable disk drive, flash memory device, tape drive, CD-ROM, DVD-ROM, Blu-ray, HD-DVD, UMD, or other optical storage devices. Stored grid information 716 or statistics 717 may be stored in the storage device 715 for quick loading into the memory 706.

One or more user input devices 720 may be used to communicate user inputs from one or more users to the computer client device 700. By way of example, one or more of the user input devices 720 may be coupled to the client device 700 via the I/O elements 711. Examples of suitable input device 720 include keyboards, mice, joysticks, touch pads, touch screens, light pens, still or video cameras, and/or microphones. The client device 700 may include a network interface 725 to facilitate communication via an electronic communications network 727. The network interface 725 may be configured to implement wired or wireless communication over local area networks and wide area networks such as the Internet. The client device 700 may send and receive data and/or requests for files via one or more message packets 726 over the network 727.

The client device 700 may further comprise a graphics subsystem 730, which may include a graphics processing unit (GPU) 735 and graphics memory 740. The graphics memory 740 may include a display memory (e.g., a frame buffer) used for storing pixel data for each pixel of an output image. The graphics memory 740 may be integrated in the same device as the GPU 735, connected as a separate device with GPU 735, and/or implemented within the memory 706. Pixel data may be provided to the graphics memory 740 directly from the CPU 705. Alternatively, the CPU 705 may provide the GPU 735 with data and/or instructions defining the desired output images, from which the GPU 735 may generate the pixel data of one or more output images. The data and/or instructions defining the desired output images may be stored in memory 710 and/or graphics memory 740. In an embodiment, the GPU 735 may be configured (e.g., by suitable programming or hardware configuration) with 3D rendering capabilities for generating pixel data for output images from instructions and data defining the geometry, lighting, shading, texturing, motion, and/or camera parameters for a scene. The GPU 735 may further include one or more programmable execution units capable of executing shader programs.

The graphics subsystem 730 may periodically output pixel data for an image from the graphics memory 740 to be displayed on a video display device 750. By way of example, and not by way of limitation, such images may include images similar to those depicted in FIG. 3, FIG. 4, FIG. 5A or FIG. 5B. The video display device 750 may be any device capable of displaying visual information in response to a signal from the client device 700, including CRT, LCD, plasma, and OLED displays. The computer client device 700 may provide the display device 750 with an analog or digital signal. By way of example, the display 750 may include a cathode ray tube (CRT) or flat panel screen that displays text, numerals, graphical symbols or images. In addition, the display 750 may include one or more audio speakers that produce audible or otherwise detectable sounds. To facilitate generation of such sounds, the client device 700 may further include an audio processor 755 adapted to generate analog or digital audio output from instructions and/or data provided by the CPU 705, memory 706, and/or storage 715.

The components of the client device 700, including the CPU 705, memory 706, support functions 710, data storage 715, user input devices 720, network interface 725, audio processor 755, and an optional geo-location device 756 may be operably connected to each other via one or more data buses 760. These components may be implemented in hardware, software or firmware or some combination of two or more of these.

It is noted that in some embodiments it may be desirable to determine a location for the client device 700 in order to facilitate the operation of the program 703. Knowledge of the location of the client device 700 can facilitate determining a relevant region, sub-region, or sub-sub region for a user of the device. By way of example, and not by way of limitation, the program 703 may use information obtained by the geo-location device 756 to facilitate determination of the location of the client device 700. The program 703 can utilize this information, e.g., to filter challenges.

By way of example, and not by way of limitation, the geo-location device 756 may include a global positioning satellite (GPS) receiver. The GPS receiver can send and receive signals from a plurality of global positioning satellites and determine the distance from the satellites through measurement of the round trip time for the signals. The program 703 or main program 701 may implement a suitable triangulation or circulation algorithm to determine the location of the device using distances to different satellites. It is noted that embodiments of the invention are not limited to those that utilize GPS to determine location. For example, geo-location may be based on a cellular telephone network that uses a plurality of cell towers. The geo-location device may be a cellular network interface that receives a signal that includes, among other things, information identifying a cell tower with which the device 700 is in direct communication. The location of the device may be approximately determined from the location of the cell tower.

Figure 8:
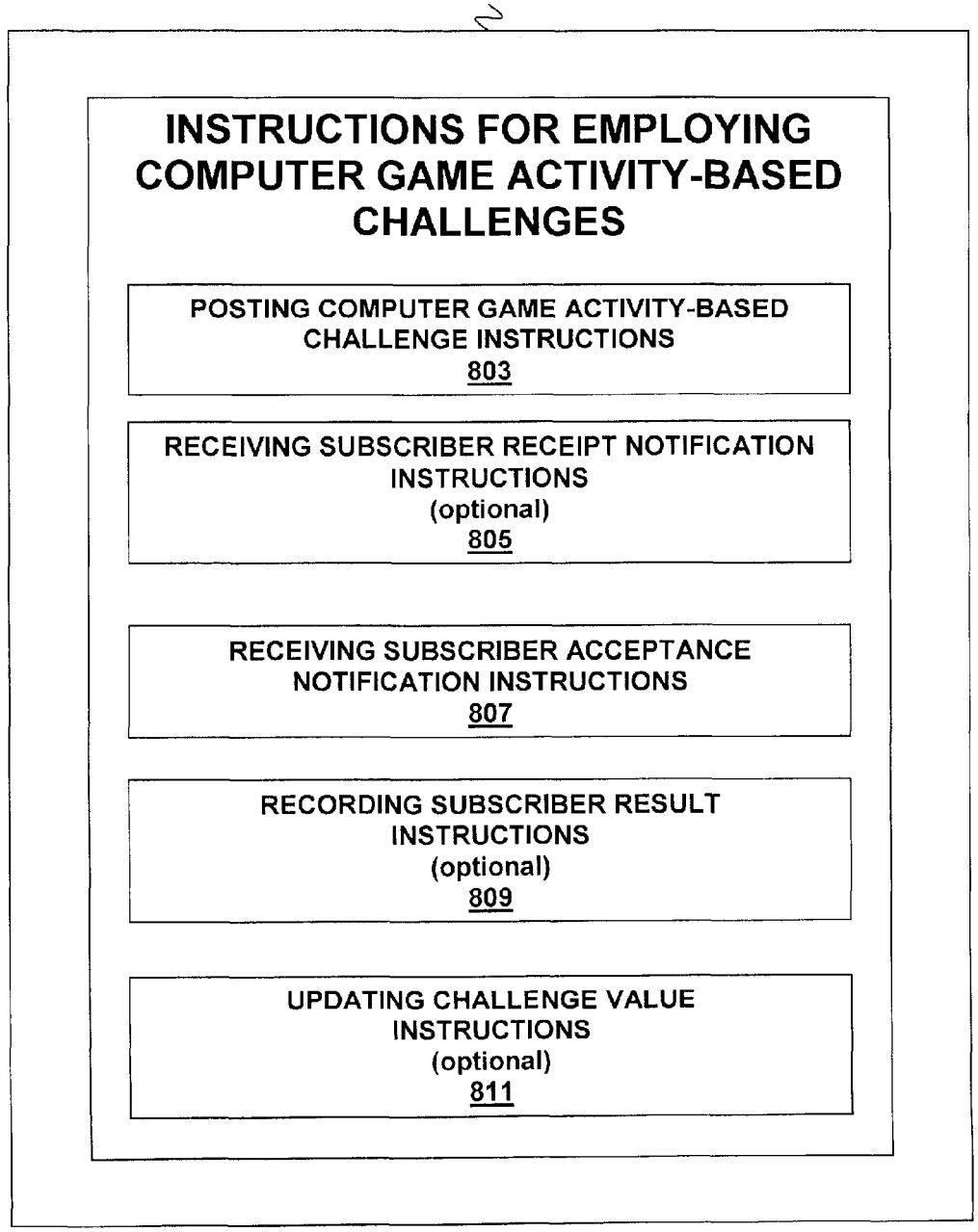
FIG. 8 illustrates an example of a non-transitory computer readable storage medium in accordance with an embodiment of the present invention.

According to another embodiment, instructions for implementing a method for employing computer game activity-based challenges may be stored in a computer readable storage medium. By way of example, and not by way of limitation, FIG. 8 illustrates an example of a non-transitory computer readable storage medium 800 in accordance with an embodiment of the present invention. The storage medium 800 contains computer-readable instructions stored in a format that can be retrieved, interpreted, and executed by a computer processing device. By way of example, and not by way of limitation, the computer-readable storage medium 800 may be a computer-readable memory, such as random access memory (RAM) or read only memory (ROM), a computer readable storage disk for a fixed disk drive (e.g., a hard disk drive), or a removable disk drive. In addition, the computer-readable storage medium 800 may be a flash memory device, a computer-readable tape, a CD-ROM, a DVD-ROM, a Blu-Ray, HD-DVD, UMD, or other optical storage medium.

The storage medium 800 contains instructions for employing computer game activity-based challenges 801 configured to implement a method for employing computer activity-based challenges in accordance with the method described above with respect to FIG. 2. In particular, the instructions for employing computer game activity-based challenges 801 may include posting computer activity-based challenge instructions 803 that are used to post a computer game activity-based challenge to a social network associated with the user. The subscribers who receive the computer activity-based challenge may be filtered according to parameters set by the computer game system as discussed above. Additionally, the type of activity-based challenges received by the subscribers may be filtered according to parameters set by the social network as discussed above.

The instructions for employing computer activity-based challenges 801 may also optionally include receiving subscriber receipt notification instructions 805 that are used to receive a notification from the social network indicating receipt of the computer game activity-based challenge by one or more subscribers of the social network The instructions for employing computer activity-based challenges 801 may further include receiving subscriber acceptance notification instructions 807 that are used to receive a notification from the social network indicating acceptance of the computer activity-based challenge for each subscriber of the social network who accepts the challenge.

The instructions for employing computer activity-based challenges 801 may optionally further include recording subscriber result instructions 709 that are used to record a result obtained by each subscriber who accepted the computer game activity-based challenge after receiving the result from the social network.

The instructions for employing computer activity-based challenges 801 may additionally include updating challenge value instructions 811 that can be used to update a value associated with the computer game activity-based challenge.

As discussed above, the value may be determined dynamically, e.g., based on a ratio between a current number of subscribers who have defeated the computer game activity-based challenge and a current number of subscribers who have accepted the computer game activity-based challenge.

While the above is a complete description of the preferred embodiment of the present invention, it is possible to use various alternatives, modifications, and equivalents. Therefore, the scope of the present invention should be determined not with reference to the above description, but should, instead be determined with reference to the appended claims, along with their full scope of equivalents. Any feature described here, whether preferred or not, may be combined with any other feature described herein, whether preferred or not. In the claims that follow, the indefinite article "A" or "An" refers to a quantity of one or more of the item following the article, except where expressly stated otherwise. The appended claims are not to be interpreted as including means-plus-function limitations, unless such a limitation is explicitly received in a given claim using the phrase "means for".

What is claimed is:

1. A method for implementing computer activity-based challenges, comprising:
    a) posting a computer activity-based challenge by a computer system to a computer-implemented social network associated with a user of the computer system;
    b) receiving a notification from the social network by the computer system indicating acceptance of the challenge for each subscriber of the social network who accepts the challenge; and
    updating a worth of the challenge with the computer system using dynamic scoring, wherein the worth of the challenge is the award granted to a subscriber upon completion of the challenge, wherein the dynamic scoring dynamically ties the worth of the challenge to a difficulty of the challenge according to results from subscribers who accept the challenge, wherein updating the worth includes increasing the worth of the challenge if the results reflect increased difficulty and decreasing the worth of the challenge if the results reflect decreased difficulty, wherein the difficulty is determined by analyzing the ratio of the number of subscribers who complete a challenge to the number of subscribers who accept a challenge, and wherein the worth of the challenge is updated after each subscriber result.

2. The method of claim 1, further comprising recording a result obtained by each subscriber who accepted the challenge by the computer system after receiving the result from the social network.

3. The method of claim 1, further comprising, after a) and before b), receiving a notification from the social network by the computer system indicating receipt of the challenge by one or more subscribers of the social network.

4. The method of claim 1, wherein the subscribers receiving the challenge are filtered by the computer system.

5. The method of claim 4, wherein the subscribers are filtered based on their location.

6. The method of claim 4, wherein the subscribers are filtered based on their names.

7. The method of claim 1, wherein the challenge received by the subscribers are filtered by the social network.

8. The method of claim 7, wherein the challenge is filtered by title of a computer associated with the challenge.

9. The method of claim 7, wherein the challenges is filtered by keyword.

10. The method of claim 1, wherein the worth associated with the challenge is assigned an initial worth prior to acceptance of the computer activity-based challenge by the subscribers of the social network.

11. The method of claim 1, wherein updating the worth involves determining a ratio between a current number of subscribers who have won the challenge and a current number of subscribers who have accepted the challenge, wherein a lower ratio reflects increased difficulty and a higher ratio reflects decreased difficulty.

12. The method of claim 1, wherein the challenge is created by the user of the computer system.

13. The method of claim 1, wherein the challenge is constrained by one or more parameters of a computer game.

14. The method of claim 13, wherein the challenge is a challenge to beat the user's high score in the computer game.

15. The method of claim 13, wherein one or more criteria for the challenge include things not directly related to gameplay activity of a single game.

16. The method of claim 13, wherein one or more criteria for the challenge include a user's physical location, purchase history, or gameplay history.

17. The method of claim 1, wherein the challenge is a collaborative challenge in which members of a group challenge each other to achieve a goal.

18. The method of claim 1, wherein the challenge includes a challenge to defeat the user in a head-to-head mode of a computer game.

19. A system for implementing computer game activity-based challenges, comprising:
    a processor;
    a memory; and
    computer coded instructions embodied in the memory and executable by the processor, wherein the computer coded instructions are configured to implement a method for employing computer game activity-based challenges, comprising:
        a) posting a computer activity-based challenge by a computer system to a computer-implemented social network associated with a user of the computer system;
        b) receiving a notification from the social network by the computer system indicating acceptance of the challenge for each subscriber of the social network who accepts the challenge; and
    updating a worth of the challenge with the computer system using dynamic scoring, wherein the worth of the challenge is the award granted to a subscriber upon completion of the challenge, wherein the dynamic scoring dynamically ties the worth of the challenge to the difficulty of the challenge according to results from subscribers who accept the challenge, wherein updating the worth includes increasing the worth of the challenge if the results reflect increased difficulty and decreasing the worth of the challenge if the results reflect decreased difficulty, wherein the difficulty is determined by analyzing the ratio of the number of subscribers who complete a challenge to the number of subscribers who accept a challenge, and wherein the worth of the challenge is updated after each subscriber result.

20. A computer program product comprising:
    a non-transitory, computer-readable storage medium having computer readable program code embodied in said medium for employing computer game activity-based challenges, said computer program product having:

a) computer readable program code means for posting a computer activity-based challenge by a computer system to a computer-implemented social network associated with a user of the computer system;
b) computer readable program code means for receiving a notification from the social network by the computer system indicating acceptance of the challenge for each subscriber of the social network who accepts the challenge; and updating a worth of the challenge with the computer system using dynamic scoring, wherein the worth of the challenge is the award granted to a subscriber upon completion of the challenge, wherein the dynamic scoring dynamically ties the worth of the challenge to the difficulty of the challenge according to results from subscribers who accept the challenge, wherein updating the worth includes increasing the worth of the challenge if the results reflect increased difficulty and decreasing the worth of the challenge if the results reflect decreased difficulty, wherein the difficulty is determined by analyzing the ratio of the number of subscribers who complete a challenge to the number of subscribers who accept a challenge, and wherein the worth of the challenge is updated after each subscriber result.

* * * * *